United States Patent
Kelly et al.

(10) Patent No.: US 6,825,645 B2
(45) Date of Patent: Nov. 30, 2004

(54) NON-RESONANT MICROWAVE IMAGING PROBE

(75) Inventors: Michael A. Kelly, Portola Valley, CA (US); Zhi-Xun Shen, Stanford, CA (US); Zhengyu Wang, Stanford, CA (US)

(73) Assignee: Stanford University Office of Technology Licensing, Stanford, CA (US)

( * ) Notice: Subject to any disclaimer, the term of this patent is extended or adjusted under 35 U.S.C. 154(b) by 262 days.

(21) Appl. No.: 10/265,996

(22) Filed: Oct. 7, 2002

(65) Prior Publication Data

US 2003/0071605 A1 Apr. 17, 2003

Related U.S. Application Data

(60) Provisional application No. 60/330,240, filed on Oct. 17, 2001.

(51) Int. Cl.[7] .............................................. G01R 31/02
(52) U.S. Cl. ........................................ 324/72.5; 378/45
(58) Field of Search ............................ 324/72.5; 378/45

(56) References Cited

U.S. PATENT DOCUMENTS

| | | | |
|---|---|---|---|
| 4,317,036 A | * 2/1982 | Wang | 378/45 |
| 4,481,616 A | 11/1984 | Matey | 369/58 |
| RE32,457 E | 7/1987 | Matey | 369/58 |
| 5,065,103 A | 11/1991 | Slinkman et al. | 324/458 |
| 5,523,700 A | 6/1996 | Williams et al. | 324/765 |
| 5,781,018 A | 7/1998 | Davidov et al. | 324/637 |
| 5,821,410 A | 10/1998 | Xiang et al. | 73/105 |
| 5,900,618 A | 5/1999 | Anlage et al. | 250/201.3 |
| 6,461,808 B1 | * 10/2002 | Bodner et al. | 435/4 |
| 6,627,461 B2 | * 9/2003 | Chapman et al. | 436/536 |
| 2002/0155625 A1 | * 10/2002 | Chapman et al. | 436/536 |
| 2002/0168659 A1 | * 11/2002 | Hefti et al. | 435/6 |

* cited by examiner

*Primary Examiner*—Charles H. Nolan, Jr.
(74) *Attorney, Agent, or Firm*—Charles S. Guenzer

(57) ABSTRACT

A non-resonant microwave imaging microscope and associated probe. The probe includes a sensor unit with two fixed electrodes, preferably a large outer electrode surrounding a small inner electrode which are approximately co-planar, thereby protecting the small inner electrode from an uneven topography. The outer electrode may be deposited on a conically shaped dielectric disk having a bore through which the inner electrode is placed. Non-resonant circuitry couples the inner electrode to the probe signal variably selected in the range of 10 MHz–50 GHz and to an amplifier whose output is coupled to a signal processor detector in-phase and out-of-phase components of the current or voltage across the two electrodes. A mechanical positioner moves the probe vertically towards the sample and scans it across the sample.

22 Claims, 3 Drawing Sheets

NON-RESONANT MICROWAVE IMAGING PROBE

RELATED APPLICATION

This application claims benefit of U.S. Provisional Application Ser. No. 60/330,240, filed Oct. 17, 2001.

BACKGROUND OF THE INVENTION

1. Field of the Invention

The invention relates generally to electrical measuring equipment and methods. In particular, the invention relates to a high-frequency probe used for mapping resistivity and other electrical characteristics in a sample with resolution of substantially less than a millimeter.

2. Background Art

There is much interest in developing a microwave microscope that uses microwave radiation in the gigahertz range to measure one or more electrical characteristics of a sample and, by scanning the probe over the sample surface, to image the spatial variation of such characteristics. Such a microwave microscope would be very useful in the semiconductor integrated circuit industry for mapping resistance or dielectric constant over the wafer, particularly during its fabrication since a microwave measurement is non-destructive. The gigahertz measurement frequency corresponds to the important frequencies utilized in semiconductor devices. However, for integrated circuits, the imaging resolution must be on the order of no less than a few microns since feature sizes are being pushed to much less. However, microwave wavelengths and waveguide dimensions are in the range of centimeters to millimeters, far greater than the desired resolution.

Several proposals have been made for microwave probes that have a spatial resolution much less than the wavelength of the radiation being used. However, they all seem to depend upon a resonant structure. For example, Xiang et al. in U.S. Pat. No. 5,821,410 describe a sharpened probe tip extending through an aperture in a resonant λ/4 cavity and projecting toward the sample under test. Such a cavity is resonant over only a narrow bandwidth band so that measurements at significantly different frequencies require multiple dedicated probes. However, it is desired that the microwave microscope be tunable over a substantial bandwidth in order to determine the frequency dependence of the material characteristics. When the narrow projecting probe is being scanned close to sample surface, it has the further drawback of being prone to strike the uneven sample surface and being permanently damaged.

Anlage et al. in U.S. Pat. No. 5,900,618 disclose a somewhat similar microwave microscope, which apparently has a wider bandwidth of operation, but it still relies upon resonance conditions in a microwave coaxial cable. It is difficult to make a coaxial cable having a diameter of the outer conductor of less than the 450 μm minimum value of Anlage et al. without losing system senstivity.

A further disadvantage of a resonant structure is its needs to have a dimension at least a quarter of the wavelength of the probing RF or microwave radiation. Typical sensors operating in the gigahertz range have resonant cavities of 1 to 3 cm$^3$ or coaxial cables 2 to 4 cm long. Such large sizes even for 10 GHz radiation makes the probe large, heavy, and thus slow to scan over a sample at a high sampling rate desired for imaging a relatively large area.

Davidov et al. in U.S. Pat. No. 5,781,018 disclose a microwave probe having a narrowly resonantly sized slit formed in the end of the microwave waveguide. While the waveguide itself is not resonant, the slit size is constrained to operation at one frequency, and the sensitivity of this system decreases rapidly as the size of the slit (and hence the resolution) is decreased.

Somewhat similar measurements can be made using a scanning capacitor measurement apparatus with a small tip electrode and the sample acting as the other electrode, such as disclosed by Williams et al. in U.S. Pat. No. 5,523,700, by Slinkman et al. in U.S. Pat. No. 5,065,103, and by Matey in U.S. Pat. No. 5,581,616 and reissued U.S. Pat. No. Re. 32,457. Calculations relate the measured capacitance over some measurement parameter such as DC voltage with electrical characteristics of the material. While these systems can be used to measure the complex impedance between tip and ground, when the sample constitutes the second electrode in opposition to the small tip electrode in the capacitance measurement, the sensed area extends far from the probe electrode, and it is difficult to relate the measured impedance to the dielectric constant and resistivity of the material.

SUMMARY OF THE INVENTION

A microwave microscope is scanned over a sample surface for imaging electrical characteristics of the sample and uses non-resonant probe and circuitry allowing sample characterization over a wide frequency range extending, for example, from 10 MHz to 50 GHz.

The probe preferably includes an outer electrode coated onto a conically shaped dielectric disk and having a central aperture in which the inner electrode is disposed. The inner electrode may have a sharpened tip and be disposed in a bore extending through the dielectric disk. The outer electrode may be grounded, and biasing and measuring circuitry is connected to the inner electrode.

The circuitry may include a negative feedback amplifier with low input impedance to measure the current between the electrodes and configured to couple the RF or microwave drive signal to the inner electrode. A signal processor receiveing the output of the amplifier may detect the in-phase and out-of-phase components (or magnitude and phase) of the amplifier output. Alternatively, the amplifier may have a high input impedance and thus measure the potential across the electrodes.

Optionally a guard electrode is disposed in the dielectric disk between the inner and outer electrodes. In this embodiment, the drive signal may be connected directly to the guard electrode and is coupled to the tip through the capacitance between these two electrodes.

The probe and measuring circuitry are non-resonant and can be driven at selected frequencies within a wide frequency range, for example, 10 MHz to 50 GHz or above. Thereby multi-frequency measurements benefit from a tunable drive source.

DETAILED DESCRIPTION OF THE PREFERRED EMBODIMENTS

Figure 1:
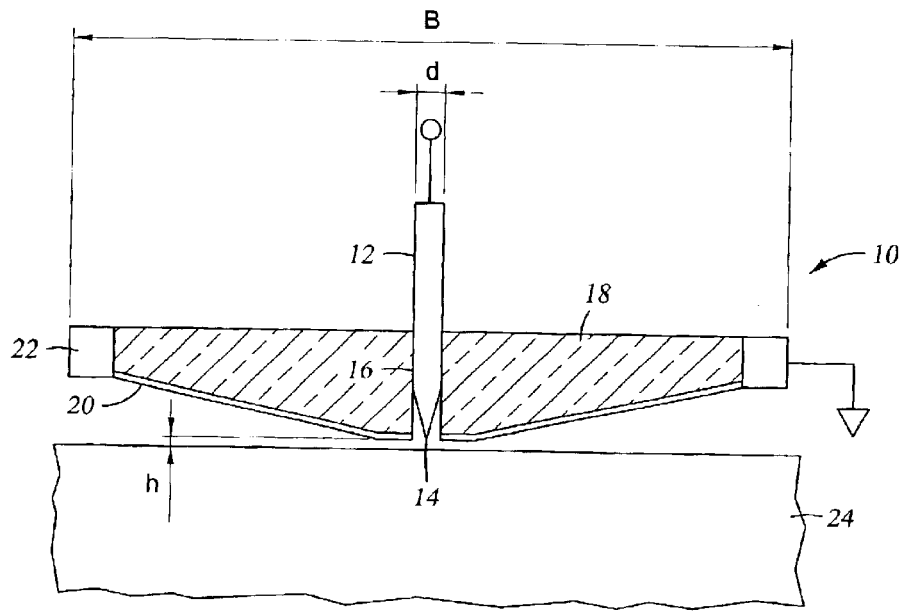
FIG. 1 is a cross-sectional view of an embodiment of a microwave or RF probe of the invention.

A probe 10 of the invention is illustrated in the cross-sectional view of FIG. 1. It includes a circularly symmetric center electrode 12 that has a sharpened tip 14 with a radius, for example, of between 0.1 to 10 μm. The center electrode is fit within a cylindrical bore 16 of a insulating disk 18, which should be formed of dielectric material having a low dielectric constant, for example, alumina, sapphire, Teflon, etc. The bore 16 has a diameter d, which may be within the range of 1 to 100 μm. The dielectric disk 18 is also circularly symmetric and has a conically shaped bottom face except possibly for a flattened portion near the disk bore 16. An outer electrode 20 is formed on the bottom of the dielectric disk 18, preferably by plating or sputtering, and is joined to a bulk annular electrode portion 22, which is typically electrically grounded and has an outer diameter B in the range of 0.1 to 10 mm. The electrode tip 14 is preferably positioned within the plane of the lowest portion of the disk 18 and its plated outer electrode 20 or slightly behind it so that the tip 14 does not protrude from the disk bore 16. The conical shape of the disk 18 allows the probe 10 to be laterally scanned within a short distance h above a sample 24 being tested which may have a relatively rough upper surface. Since the tip 14 does not protrude from the disk bore 16, it will not be damaged by the rough surface. The distance h is preferably held within the range of zero to the bore diameter d. With these parameters, the capacitance between the two electrodes 12, 20 is typically between 0.001 to 0.5 pF. On the other hand, if the tip 14 does protrude beyond the lowermost plane of the outer electrode 20, spatial resolution will be further increased. Even though the capacitance is being measured between the two electrodes 12, 20 which are typically separated by distance substantially more than 1 μm, for those measurements dependent upon induced surface charge, the capacitance between the sample 24 and the very small sharpened tip 14 is much smaller than the serially connected capacitance between the sample 24 and the much larger outer electrode 20. Hence, in a high-frequency measurement, most of the electromagnetic filed is near the high-impedance tip so the spatial resolution of the probe is on the order of the tip radius.

Figure 2:
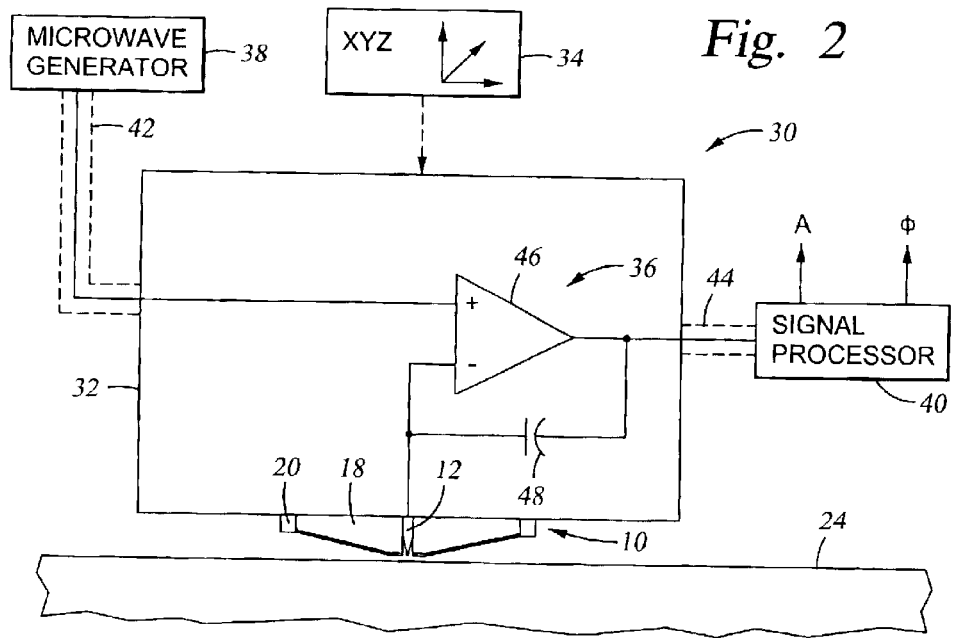
FIG. 2 is a schematic representation of electronics that may be used with the probe of FIG. 1.

The probe 10 is incorporated into a sensor unit 30 schematically illustrated in FIG. 2 and is mounted on a metal shielded enclosure 32. An XYZ positioning system 34 is capable of moving the enclosure 32 and attached probe 10 independently in the x-, y-, and z-directions with sub-micron resolution. Such positioning systems are well known for use with atomic force microscopes and may be based on piezo electric tubes and other elements. Alternatively, the sample 24 may be moved relative to a stationary probe 10 to provide relative motion in three-dimensions between the probe 10 and sample 24.

An electronic circuit 36 included within the enclosure 32 electronically couples an input drive signal from a microwave generator 38 to the center electrode 12. A signal processor 40 processes the signal output from the center electrode 12 through the electronic circuit 36. Coaxial cables 42, 44 couple microwave signals from the microwave generator 38 to the electronic circuit 36 and from the electronic circuit 36 to the signal processor 40. The outer shields of the coaxial cables 42, 44, held nominally at ground, are connected to the shielded enclosure 32 and thence to the outer electrode 20 of the probe 10. It is understood that other types of transmission line, such as strip line particularly for higher frequencies, may replace at least part of the coaxial cables. The signal processor 40 may be implemented as a lock-in amplifier at lower frequencies. At microwave frequencies, it may be implemented as a microwave mixer receiving the RF reference and sample signals, producing an output whose amplitude and phase define the real and imaginary components of the tip impedance. By measuirng the change in this impedance when the sample 24 is brought near the tip 14, the dielectric constant and conductivity of the sample 24 can be determined.

The system typically induces an RF or microwave signal across the electrodes 12, 20 with a magnitude of 1 to 10V RMS at a frequency of between 10 MHz and 10 GHz. Generally, the higher frequencies provide better resolution, and gigahertz frequencies are of particular interest for semiconductor circuits. However, the lower RF frequencies may be interest in establishing characteristic energies in the sample material. The non-resonant design allows a single small probe to be used across the entire frequency range so that the RF or microwave generator 38, more generally referred to as a source of alternating electrical potential, is preferably tunable across all or part of this range.

The electronic circuit 36 can incorporate any low-noise, preferably miniaturized design common in the art, such as strip line and/or discrete components or integrated circuits, which produce the required potential difference across the electrodes 12, 20 and determines the current flowing between them. The electronic circuit 36 is represented as an operational amplifier 46 with a capacitor in a negative feedback loop, its positive terminal receiving the microwave drive signal, its negative terminal connected to the center electrode 12, and its output connected to the signal processor 40, thereby acting as a capacitance measuring system measuring the capacitance across the electrodes 12, 20. Elements needed to correct for phase shift and biasing are not shown. Although the feedback element is shown as a capacitance, which is preferred for high-frequency operation, other feedback impedances may be used depending upon the application. More complicated circuitry than that illustrated, commonly known in the art, can be used to cancel most of the output signal when no sample is present so the signal reaching the signal processor 40 represents the difference in the tip impedance due to the presence of the sample.

The electrodes 12, 20 and the electrical lines linking them to the electrical circuit 36 are non-resonant with no strong peaks or nulls in their electrical characteristics. In particular, the electrical length of the connection between the electronic circuit 36 and the tip of the center electrode 12 is substantially less than one-quarter of the shortest electrical wavelength of the probing signal. By substantially less is meant no more than 75% of the quarter wavelength since even resonant probes are often operated somewhat off the resonance peak. For a 10 GHz microwave signal, such a length is less than about 7.5 mm. Such a short length has the further advantage of reduced capacitance contributed by the line and low noise pickup. The length may be determined between the probe tip and a coupling or transforming circuit that buffers the amplifying and biasing circuit from the non-resonant line.

The signal processor 40 mixes the RF or microwave signal from the generator 38 with the output of the electronic circuit to produce amplitude and phase signals A and φ representing the complex impedance across the electrodes 12, 20 and hence of the surface area of the sample 24 over which the tip of the probe 10 is currently positioned. The phase φ may be referenced to the probing signal from the microwave or RF generator 38, which is directly input to the signal processor 40 over an unillustrated transmission line. Alternatively, the signal processor 40 may produce two output signals representing quadrature or parts of the signal from the probe, that is, the amplitude of two signal components that are 90° out of phase with each other. With proper design well known in RF and microwave circuitry, the bandwidth (sampling frequency or inverse time constant) of the electronic circuit 36 and signal processor 40 can be between 10 Hz and 1 MHz, which is quite adequate for fast, detailed imaging of the sample surface. On the other hand, there are some measurements which do not require a two-component or complex measurement, in which case an envelope detector or other simple one-output detecting circuitry may be used.

In the case of uneven topography of the sample, any combination of the amplitude and phase signals A and φ can be fed back to the positioning system 34 to maintain the 14 tip of the center electrode 12 a fixed height in the z-direction above the sample surface while the probe 10 is being scanned in the x- and y-dimensions.

Figure 3:
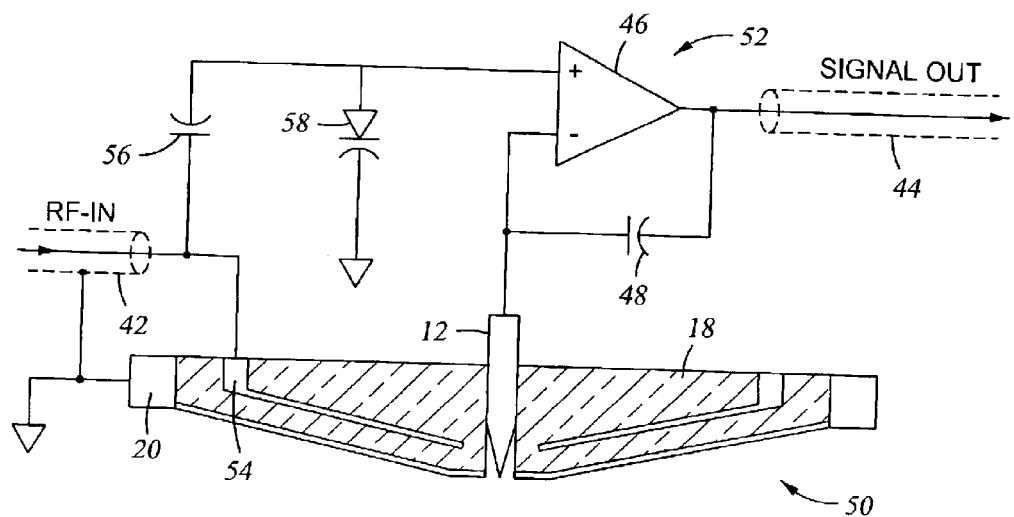
FIG. 3 is a schematic representation of a second embodiment of a probe of the invention and electronics usable with it.

Another embodiment, as schematically illustrated in FIG. 3, includes a modified probe 50 and a modified electronic circuit 52, which minimize inter-electrode capacitance and decrease the common-mode output signal of the amplifier 46. A guard electrode 54 is embedded in the dielectric disk 18 between the center electrode 12 and the grounded outer electrode 20. The input RF signal on the input coaxial cable 52 is directly coupled to the guard electrode 54, and the capacitance between the guard electrode 52 and the center electrode 12 produces the desired RF signal between the center electrode 12 and the grounded outer electrode 20. A voltage divider formed by an input capacitor 56 between the input RF signal and the positive input of the operational amplifier 46 and by a grounded varactor diode 58 connected to the same positive input reduces the oscillating potential on the positive input of the amplifier 46 to a value approximately equal to the that on the center electrode 12 with no sample present, which condition produces a null output of the amplifier 46. Thereafter, as the probe 50 approaches the sample, the output signal represents the current flowing through the sample rather than the total current between the electrodes 12, 20.

The embedded guard electrode 54 can be fabricated by plating both it and the outer electrode 20 on opposite sides of a thin conically shaped dielectric disk with its central aperture formed before or after plating. The dielectric in back of the guard electrode 54 can be thereafter deposited or an apertured small bulk dielectric member can be affixed to provide mechanical support for the center electrode 12.

Figure 4:
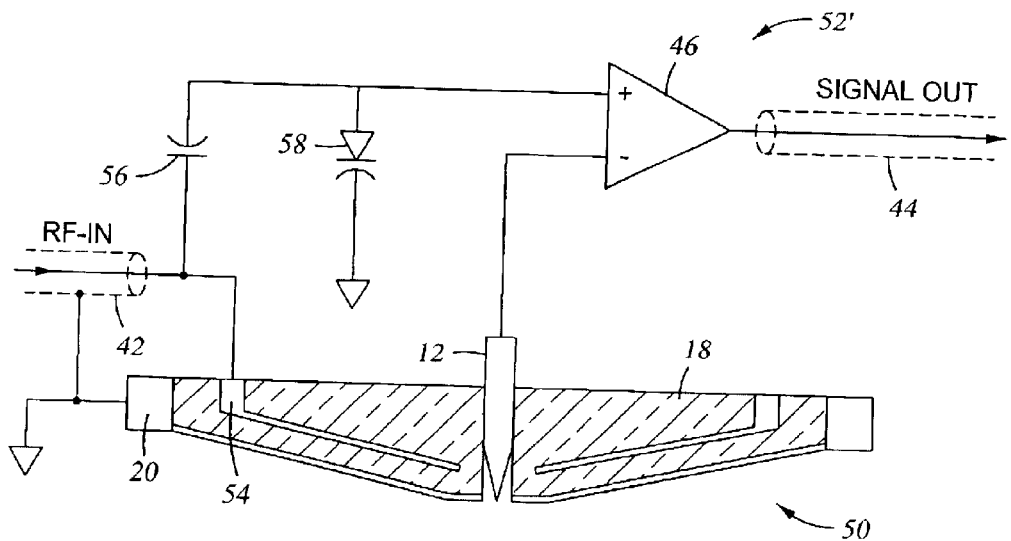
FIG. 4 is a schematic representation of a third embodiment using the probe of FIG. 3 but used with voltage sensitive electronics.

Another embodiment of circuitry 52' illustrated schematically in FIG. 4 includes substantially no feedback impedance around the amplifier 46 so that it operates as a high-gain voltage detector. As in the circuitry 50 of FIG. 3, with the probe 50 withdrawn from the sample, the varactor 58 is adjusted to produce a null output from the amplifier 46. Thereafter, when the probe 50 is lowered to the sample, the amplifier output measures the voltage sensed between the electrodes 12, 20 rather than the current. The circuit 36 of FIG. 2 can be similarly modified.

The electronic circuit 52, as well as circuit 30 of FIG. 2, ignore signal propagation times and are low-frequency idealizations of realistic designs. That is, the circuits 30, 52 do not include elements for biasing and phase compensation that are included in standard and well known designs for microwave and RF circuits.

Figure 5:
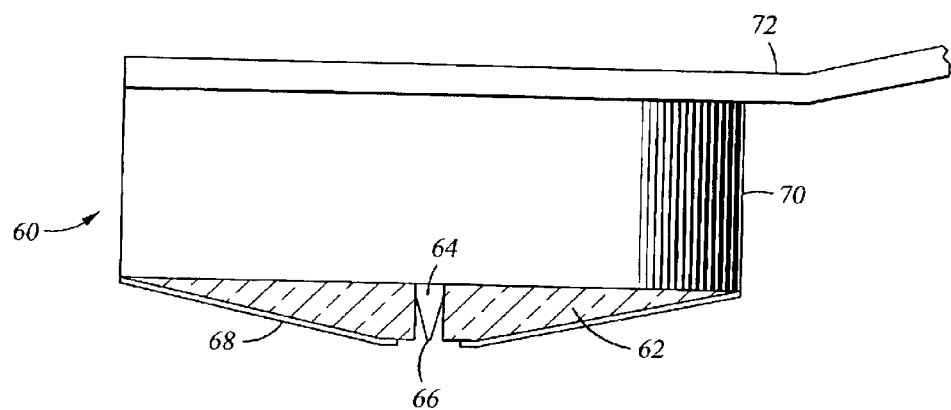
FIG. 5 is a cross-sectional view of a third embodiment of a probe of the invention taken along view line 5—5 of FIG. 6.
Figure 6:
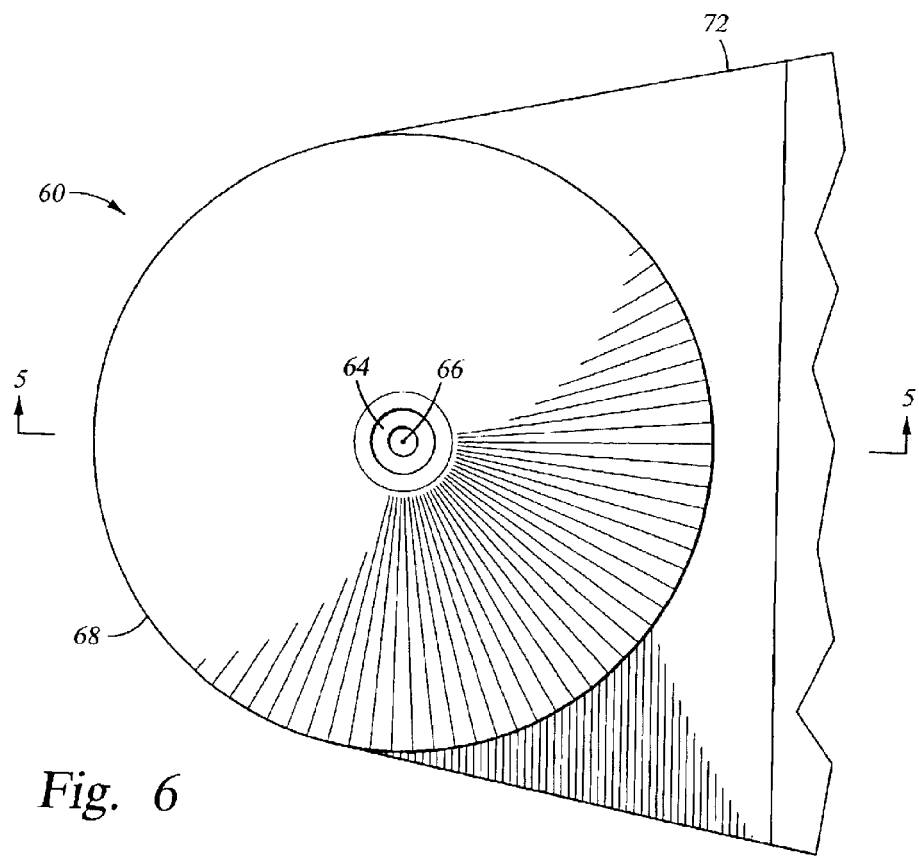
FIG. 6 is a bottom plan view of the probe of FIG. 5.

A sensor 60, illustrated in side cross-sectional view in FIG. 5 and bottom plan view in FIG. 6, is suitable for fabrication by lithographic techniques well developed for integrated circuits. A via hole is etched in a beveled ceramic disk 62 and is filled with a via metal 64. A center electrode 66 and a surrounding outer electrode 68 are sputtered and patterned on the via metal 64 and the beveled face of the ceramic disk respectively 62. For increased spatial resolution, a nanotip, such as a carbon nanotube, with a radius of less than 100 nm can be attached to the center electrode. The ceramic disk 62 is mounted to the bottom of a cylindrical grounded enclosure 70 containing the miniaturized electronics, which may be a single microcircuit performing the functions described earlier. The grounded enclosure 70, which typical has a diameter and thickness in the range of 10 to 100 μm, is supported on a cantilever 72 which together with the probe tip can be rapidly and accurately positioned and scanned over the sample surface.

The very light weight of the sensor 60 allows more rapid scanning permitting acquisition of an image in fractions of a second rather than minutes. Because the sensor is non-resonant, its size is not limited to the wavelength of the probing RF or microwave signal.

The very small size of the two electrodes enhances the sensitivity of the measurement. The small spacing increases the spatial resolution, which is typically the larger of the dimension of the inner electrode and of the sample-electrode spacing. Further, the small spacing and dimension of the inner electrode decreases the probe capacitance so small changes in the electrical properties of the sample cause correspondingly larger percentage changes in the measured voltage or current.

The feedback and biasing made possible by the non-resonant electronics reduces the input impedance of the detection circuitry, giving it improved signal-to-noise performance relative to circuits employing small resonators.

The use of two electrodes in the probe, rather than a grounded sample, restricts the probing current to a small area of the sample, hence increasing the spatial resolution. The generally planar configuration of the two electrodes greatly enhances the mechanical ruggedness and reliability of the probe since the larger outer electrode surrounds and can be arranged to protect the fragile small center electrode.

Although the probe is most advantageously used with microwave probing signals, it may be used with lower frequency probe signals, for example, at RF frequencies extending down to 10 MHz and possibly below.

What is claimed is:

1. An alternating potential microscope, comprising:
   a source of alternating electrical potential outputting an electrical signal within a wavelength range;
   a probe having a first electrode and a second electrode arranged to be non-resonant within said wavelength range, receiving said alternating potential, and positionable adjacent a surface of a sample to be characterized and scannable along said surface; and
   an electrical circuit coupling said source of alternating current to said probe; and
   a signal processor receiving a characterizing signal from an electrical signal across said electrodes and passing through said electrical circuit.

2. The microscope of claim 1, wherein said signal processor determines a current flowing between said electrodes.

3. The microscope of claim 1, wherein said signal processor determines quadrature components of said electrical signal relative to said alternating electric potential.

4. The microscope of claim 1, wherein said electrical circuit is separated from at least one of said electrodes by an electrical length substantially less than a quarter of a minimum wavelength within said wavelength range.

5. The microscope of claim 1, wherein said source of alternating electrical potential outputs a signal within a frequency range of 10 MHz to 50 GHz.

6. The microscope of claim 5, wherein said source is tunable over at least a portion of said frequency range.

7. The microscope of claim 1, wherein said first electrode surrounds said second electrode.

8. The microscope of claim 7, wherein said second electrode has a tip with a radius of less than 10 $\mu$m.

9. The microscope of claim 8, wherein said radius is less than 100 nm.

10. The microscope of claim 8, wherein said tip protrudes from a bore in a dielectric material separating said first and second electrodes no further than said first electrode.

11. The microscope of claim 7, wherein said first electrode is conically shaped.

12. The microscope of claim 7, further comprising a third electrode positioned between said first and second electrode.

13. The microscope of claim 12, wherein said first electrode is connected to a predetermined potential, said third electrode is connected to said source of alternating potential, and said circuit comprises an amplifier connected to said first electrode and connected through a capacitor to said source of alternating potential.

14. The microscope of claim 7, wherein said first electrode is connected to a predetermined potential and said circuit comprises an amplifier connected to said second electrode and to said source of alternating potential.

15. The microscope of claim 14, wherein said amplifier includes negative feedback.

16. The microscope of claim 1, further comprising a mechanical positioner for positioning said probe in three orthogonal dimensions with respect to said sample.

17. The microscope of claim 1, wherein said probe further comprises a dielectric disk having a face that is at least partially conically shaped; wherein said first electrode is coated on said face and has a central aperture and wherein said second electrode is positioned within said central aperture.

18. The microscope of claim 17, wherein said disk has a central bore with an end within said central aperture and wherein said second electrode has a sharpened tip disposed no further out of said bore than an outermost plane of said first electrode.

19. The microscope of claim 17, further comprising a guard electrode disposed between said first and second electrodes.

20. The microscope of claim 17, wherein said first electrode is held at a predetermined potential and further comprising an amplifying circuit connected to said second electrode and couplable to a source of alternating potential.

21. The microscope of claim 20, wherein said amplifying circuit includes negative feedback.

22. The microscope of claim 17, wherein said aperture has a diameter of no more than 100 $\mu$m.

* * * * *